US011760345B2

(12) United States Patent
Kozono et al.

(10) Patent No.: US 11,760,345 B2
(45) Date of Patent: Sep. 19, 2023

(54) VEHICLE TRAVELING CONTROL APPARATUS

(71) Applicant: SUBARU CORPORATION, Tokyo (JP)

(72) Inventors: Kazuya Kozono, Tokyo (JP); Hikaru Abe, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 164 days.

(21) Appl. No.: 17/494,983

(22) Filed: Oct. 6, 2021

(65) Prior Publication Data
US 2022/0105927 A1    Apr. 7, 2022

(30) Foreign Application Priority Data

Oct. 6, 2020   (JP) ................. 2020-169370
Sep. 24, 2021  (JP) ................. 2021-155849

(51) Int. Cl.
*B60W 30/09*  (2012.01)
*G01S 13/931* (2020.01)
*G01S 13/58*  (2006.01)

(52) U.S. Cl.
CPC ............ *B60W 30/09* (2013.01); *G01S 13/58* (2013.01); *G01S 13/931* (2013.01); *B60W 2420/52* (2013.01); *B60W 2554/4041* (2020.02); *B60W 2554/4042* (2020.02); *B60W 2554/4043* (2020.02); *B60W 2554/801* (2020.02); *B60W 2554/802* (2020.02); *G01S 2013/93185* (2020.01)

(58) Field of Classification Search
CPC ............ B60W 30/09; B60W 2420/52; B60W 2554/4041; B60W 2554/4042; B60W 2554/4043; B60W 2554/801; B60W 2554/802; B60W 30/0956; G01S 13/58; G01S 13/931; G01S 2013/93185
See application file for complete search history.

(56) References Cited

U.S. PATENT DOCUMENTS

2018/0174465 A1*  6/2018  Ikedo ................. B60W 50/14
2021/0300345 A1*  9/2021  Sato .................... G08G 1/167

FOREIGN PATENT DOCUMENTS

JP          2019-172113 A     10/2019

* cited by examiner

*Primary Examiner* — Tarek Elarabi
(74) *Attorney, Agent, or Firm* — TROUTMAN PEPPER HAMILTON SANDERS LLP

(57) ABSTRACT

A vehicle traveling control apparatus for a vehicle identifies a mobile object as a crossing mobile object if the supplementary angle of the angle formed between the velocity vector of the mobile object and the traveling direction of the vehicle is greater than a threshold. In a case where the supplementary angle was equal to or less than the threshold before the identification as the crossing mobile object and where a lateral position of the crossing mobile object is equal to or less than a distance threshold at the time of the identification, or in a case where the size of the crossing mobile object has been less than a predetermined value for a predetermined period of time or longer and where the lateral position is equal to or less than the distance threshold at the time of the identification, the crossing mobile object is excluded from emergency braking targets.

3 Claims, 11 Drawing Sheets

VEHICLE TRAVELING CONTROL APPARATUS

CROSS-REFERENCE TO RELATED APPLICATION

The present application claims priority from Japanese Patent Application Nos. 2020-169370 filed on Oct. 6, 2020, and 2021-155849 filed on Sep. 24, 2021, the entire contents of which are hereby incorporated by reference.

BACKGROUND

The technology relates to a vehicle traveling control apparatus.

Recently, traveling control apparatuses that assist drivers in driving vehicles, such as automobiles, have been put into in a practical use to reduce the driving operation load on the driver and achieve higher safety driving. Various techniques for these traveling control apparatuses have been developed to achieve a traveling control mode in which steering assist control or acceleration and deceleration control are executed assuming that the driver independently performs driving operations and a traveling control mode (a so-called automatic drive mode) in which the vehicle is caused to travel without requiring driver's driving operations. Reference is made to Japanese Unexamined Patent Application Publication No. 2019-172113, for example.

SUMMARY

An aspect of the technology provides a vehicle traveling control apparatus to be applied to a vehicle. The vehicle traveling control apparatus includes a radar device, a mobile object recognizing unit, a crossing mobile object identifying unit, an emergency brake controlling unit, and an exclusion determining unit. The radar device is configured to detect a mobile object in every predetermined frame cycle. The mobile object recognizing unit is configured to recognize the approach of the mobile object to the vehicle. The crossing mobile object identifying unit is configured to calculate the velocity vector of the mobile object on the basis of a moving direction of the mobile object measured in a number of latest frames previously set, and identify the mobile object as a crossing mobile object in a case where the supplementary angle of the angle formed by the velocity vector with respect to the traveling direction of the vehicle is greater than a predetermined angle threshold. The emergency brake controlling unit is configured to execute emergency braking to stop the vehicle in a case where there is a possibility of contact between the crossing mobile object and the vehicle. The exclusion determining unit is configured to exclude the crossing mobile object from control targets of the emergency braking in a case where the supplementary angle of the angle formed by the velocity vector of the mobile object was equal to or less than the predetermined angle threshold before the mobile object is identified as the crossing mobile object and where a lateral position of the crossing mobile object with respect to the vehicle is equal to or less than a predetermined distance threshold at the time the mobile object is identified as the crossing mobile object, or in a case where the size of the mobile object identified as the crossing mobile object has been maintained less than a predetermined value for a predetermined period of time or longer and where the lateral position of the crossing mobile object with respect to the vehicle is equal to or less than the predetermined distance threshold at the time the mobile object is identified as the crossing mobile object.

An aspect of the technology provides a vehicle traveling control apparatus to be applied to a vehicle. The vehicle traveling control apparatus includes circuitry configured to recognize the approach of a mobile object to the vehicle on the basis of information received from a radar device configured to detect the mobile object in every predetermined frame cycle, calculate the velocity vector of the mobile object on the basis of a moving direction of the mobile object measured in a number of latest frames previously set, identify the mobile object as a crossing mobile object in a case where the supplementary angle of the angle formed by the velocity vector with respect to the traveling direction of the vehicle is greater than a predetermined angle threshold, execute emergency braking to stop the vehicle in a case where there is a possibility of contact between the crossing mobile object and the vehicle, and exclude the crossing mobile object from control targets of the emergency braking in a case where the supplementary angle of the angle formed by the velocity vector of the mobile object was equal to or less than the predetermined angle threshold before the mobile object is identified as the crossing mobile object and where a lateral position of the crossing mobile object with respect to the vehicle is equal to or less than a predetermined distance threshold at the time the mobile object is identified as the crossing mobile object, or in a case where the size of the mobile object identified as the crossing mobile object has been maintained less than a predetermined value for a predetermined period of time or longer and where the lateral position of the crossing mobile object with respect to the vehicle is equal to or less than the predetermined distance threshold at the time the mobile object is identified as the crossing mobile object.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
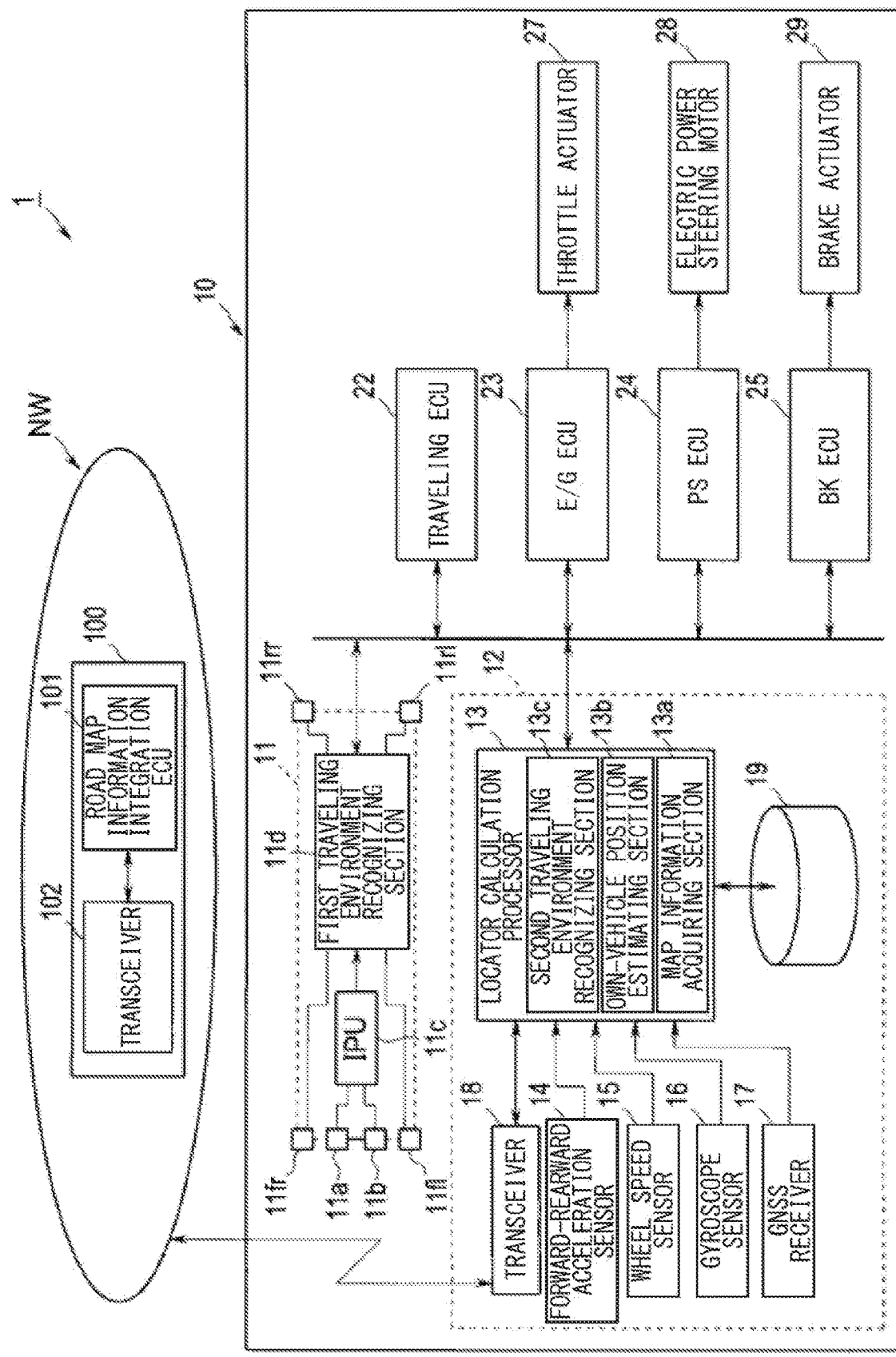
FIG. 1 is a block diagram illustrating an exemplary overall configuration of a traveling control system according to one example embodiment of the technology.

A traveling control apparatus generally executes traveling control using an adaptive cruise control (ACC) function and an active lane keep centering (ALKC) control function, for example. Under the traveling control, the vehicle is caused to automatically travel along a traveling lane while keeping an inter-vehicular distance from a preceding vehicle.

A technique for the traveling control apparatus has been in practical use which executes emergency brake control, such as autonomous emergency braking (AEB) control, to stop an own vehicle at a position before an obstacle, such as a vehicle or pedestrian, detected in front of the own vehicle by a traveling environment recognizing device including an autonomous sensor such as a camera and radar. Generally, in the AEB control, a point located on the obstacle and closest to the own vehicle in a straight-line distance is set as a representative point, and brake control is executed to stop the own vehicle before the representative point.

Another technique has been recently developed which executes the emergency brake control, such as front cross traffic brake (FCTB) control, against a crossing mobile object as well as an object present in front of the own vehicle. The crossing mobile object is an obstacle, such as a vehicle, moving in a direction crossing an own vehicle traveling road toward the own vehicle. In the FCTB control, a predicted traveling route is calculated on the basis of the traveling trajectory of the crossing mobile object, and a crossing point between the predicted traveling route of the crossing mobile object and the own vehicle traveling route is calculated. If the crossing mobile object is estimated to reach a predetermined region set with respect to the crossing point at the time the own vehicle reaches the crossing point, emergency braking is executed under the FCTB control. The FCTB control is executed against a mobile object having a given lateral velocity in a direction crossing the own vehicle traveling route with respect to the own vehicle, for example.

The lateral velocity of the mobile object recognized by the radar device can be wrongly detected under a predetermined condition, such as when the mobile object is moving at a low speed. If the lateral velocity is wrongly detected, an oncoming mobile object which will pass by the side of the own vehicle can be wrongly identified as the crossing mobile object. In such a case, emergency braking of the own vehicle can be unnecessarily executed under the FCTB control, which can make an occupant in the own vehicle feel strange.

It is desirable to provide a vehicle traveling control apparatus that makes it possible to properly determine whether a mobile object is an oncoming mobile object or a crossing mobile object and thereby reduce unnecessary execution of emergency braking.

Hereinafter, some example embodiments of the technology are described with reference to the accompanying drawings. These drawings illustrate an example embodiment of the technology. Note that the drawings used in the following description are schematic and are not intended to be drawn to scale, and the dimensional relationship and scale reduction of the elements illustrated in the drawings may differ between the elements. Thus, factors including, without limitation, numerical values, shapes, materials, dimensional ratios, and positions of the elements, and how the elements are coupled to each other are illustrative only and not to be construed as limiting to the technology. Further, the elements in the following example embodiments that are not recited in a most-generic independent claim of the technology are optional and may be provided on an as-needed basis.

Figure 2:
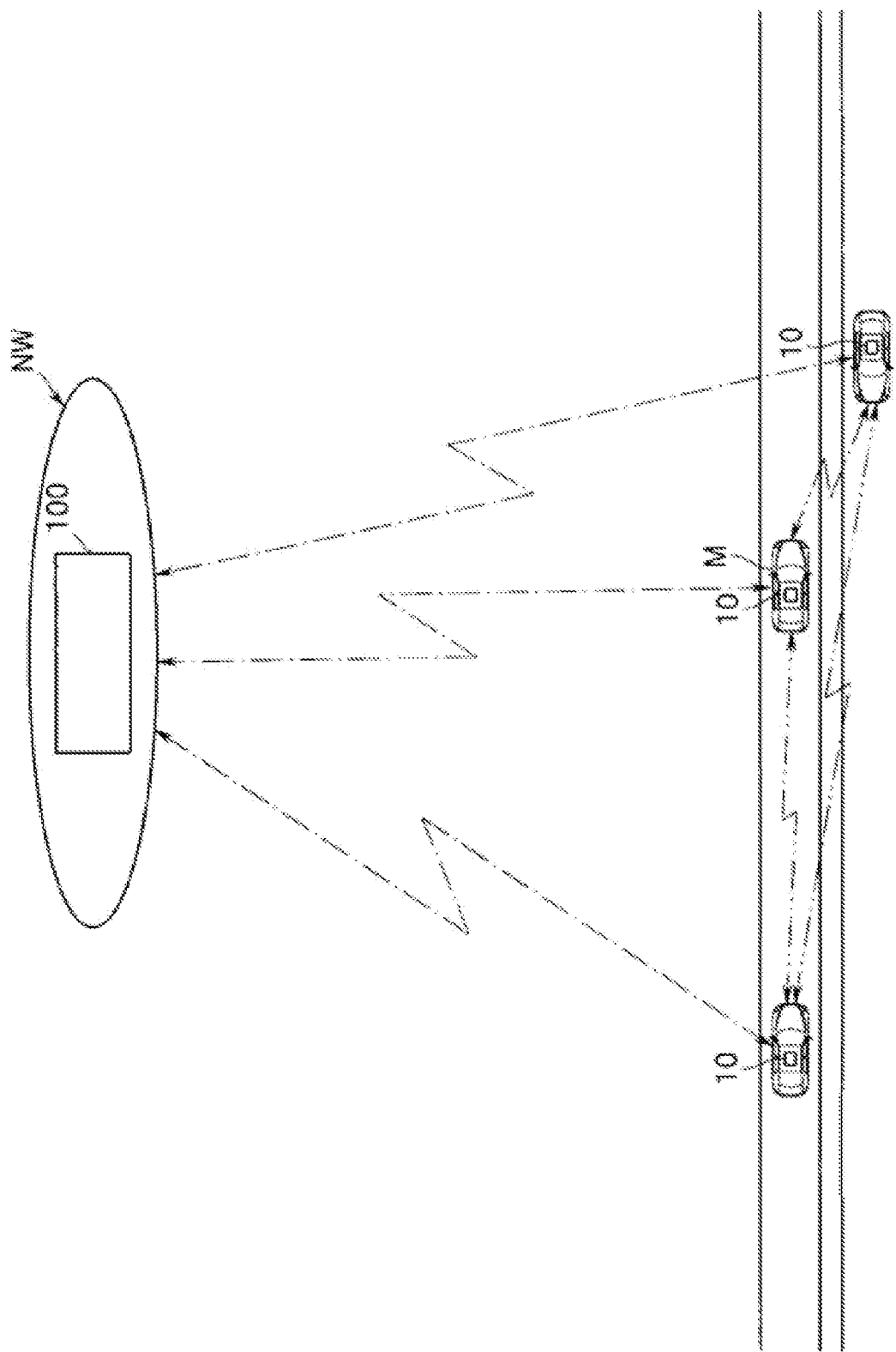
FIG. 2 is an explanatory diagram illustrating exemplary road-to-vehicle communication and exemplary inter-vehicle communication.

FIG. 1 illustrates an exemplary overall configuration of a traveling control system 1 according to an example embodiment of the technology. As illustrated in FIGS. 1 and 2, the traveling control system 1 may include a plurality of traveling control apparatuses 10 mounted in respective vehicles and a control system 100 provided in a network environment NW. The traveling control apparatuses 10 may be connected to the control system 100 via wireless communication. For example, the control system 100 may be a server system provided in a cloud computing network environment, an edge computing network environment, or a road ancillary equipment network environment.

The control system 100 may integrate and update road map information sequentially received from the traveling control apparatuses 10 in the respective vehicles and send the updated road map information to the vehicles. To this end, the control system 100 may include a road map information integration ECU 101 and a transceiver 102.

The road map information integration ECU 101 may integrate the road map information collected from the vehicles via the transceiver 102 to sequentially update the road map information regarding the road on which the vehicles are traveling. For example, the road map information may include a dynamic map having four information layers: static information, quasi-static information, quasi-dynamic information, and dynamic information. The static information and the quasi-static information may mainly include road information, and the quasi-dynamic information and the dynamic information may mainly include traffic information.

The static information may include data on roads and structures on the roads, data on lanes, data on road surfaces, data on permanent traffic regulations, and the like that need to be updated every month.

The quasi-static information may include data on traffic regulations due to road constructions or other events, data on wide-range weather, data on traffic congestion estimation, and the like that need to be updated every hour.

The quasi-dynamic information may include data on an actual traffic congestion status or a traveling regulation at a measurement time, data on fallen objects or obstacles, data on a temporary traveling trouble status, data on the status of accident actually happened, data on narrow-range weather, and the like that need to be updated every minute.

The dynamic information may include data transmitted or exchanged between mobile objects, data on a signal being currently indicated, data on pedestrians and two-wheel vehicles present at an intersection, data on a vehicle traveling straight through the intersection, and the like that need to be updated every second.

These pieces of the road map information may be maintained or updated until the next road map information is received from each vehicle, and the updated road map information may be transmitted to each vehicle via the transceiver 102 as appropriate.

The traveling control apparatus 10 may include a traveling environment recognizing unit 11 and a locator unit 12 that recognize a traveling environment outside the own vehicle. The traveling control apparatus 10 may further include a traveling control unit (hereinafter referred to as traveling ECU) 22, an engine control unit (hereinafter referred to as E/G ECU) 23, a power steering control unit (hereinafter referred to as PS ECU) 24, and a brake control unit (hereinafter referred to as BK ECU) 25. These control units 22 to 25 may be coupled to the traveling environment recognizing unit 11 and the locator unit 12 via in-vehicle communication lines such as controller area networks (CAN).

The traveling environment recognizing unit 11 may be fixed at an upper central position on the front interior portion of the vehicle compartment, for example. The traveling environment recognizing unit 11 may include an in-vehicle camera (stereo camera), an image processing unit (IPU) 11c, and a first traveling environment recognizing section 11d. The in-vehicle camera may include a main camera 11a and a sub-camera 11b.

The main camera 11a and the sub-camera 11b may be autonomous sensors that sense the real space in front of an own vehicle M. The main camera 11a and the sub-camera 11b may be disposed symmetrically about the middle of the vehicle width direction and capture stereo images of a front region Af (see FIG. 3) extending in front of the own vehicle M from different points of view.

The IPU 11c may perform predetermined image processing of the data on the front traveling environment images captured by the main camera 11a and the sub-camera 11b to generate front traveling environment image information including distance data. The distance data may be calculated on the basis of the amount of shift between corresponding positions. The front traveling environment image information may be also referred to as distance image data.

The first traveling environment recognizing section 11d may recognize lane dividing lines that divide the road located around the own vehicle M on the basis of the distance image data received from the IPU 11c.

The first traveling environment recognizing section 11d may further calculate the road curvatures [Um] of the left and right lane dividing lines that respectively define the left and right sides of the road on which the own vehicle M is traveling (hereinafter referred to as an own vehicle traveling lane), and the width between the left and right lane dividing lines (i.e., the lane width). The road curvatures and the lane width may be calculated by various known methods. For example, the first traveling environment recognizing section 11d may recognize the left and right lane dividing lines on the basis of the front traveling environment image information through a binarization process using luminance differences and calculate the curvatures of the left and right lane dividing lines in each predetermined section through a least-square method using a curve approximate expression.

The first traveling environment recognizing section 11d may further perform predetermined pattern matching of the distance image data to recognize three-dimensional objects, such as guardrails and curbs that extend along the road, and pedestrians, two-wheel vehicles, and vehicles other than the two-wheel vehicles that are present on the road around the own vehicle M. In the recognition of a three-dimensional object, the first traveling environment recognizing section 11d may detect the type of the three-dimensional object, the distance to the three-dimensional object, the speed of the three-dimensional object, and a relative speed between the three-dimensional object and the own vehicle M, for example. The three-dimensional object recognized on the basis of the image captured by the in-vehicle camera may be hereinafter referred to as a camera object.

To the first traveling environment recognizing section 11d, a plurality of autonomous sensors such as radar devices may be coupled. The radar devices may include, for example, a left-front side radar device 11fl, a right-front side radar device 11fr, a left-rear side radar device 11rl, and a right-rear side radar device 11rr.

Figure 3:
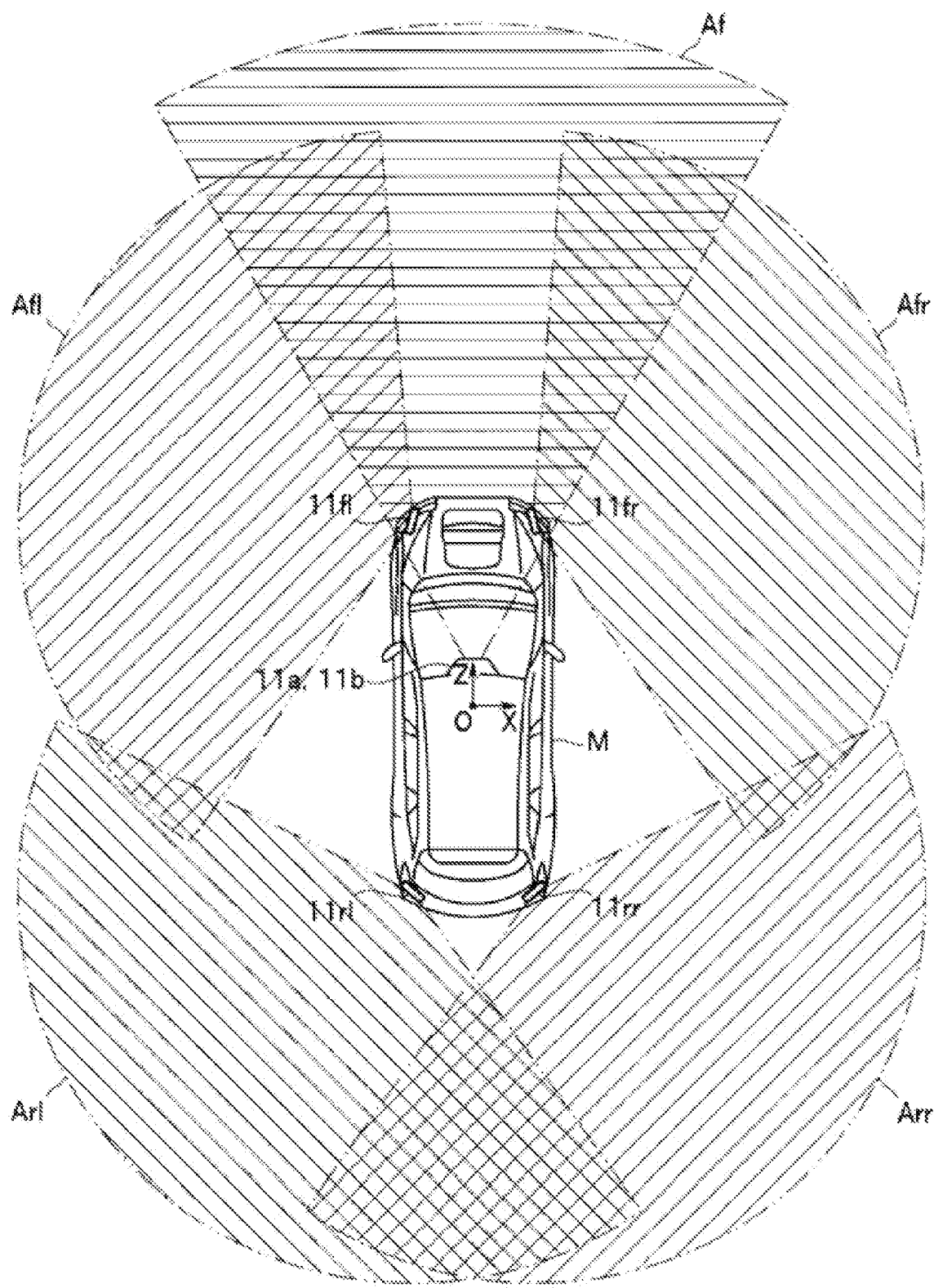
FIG. 3 is an explanatory diagram illustrating an exemplary monitoring region of a stereo camera and a radar device.

The left-front side radar device 11fl and the right-front side radar device 11fr may be respectively disposed on the left and right sides of the front bumper, for example. The left-front side radar device 11fl and the right-front side radar device 11fr may monitor respective regions that the main camera 11a and the sub-camera 11b are not able to monitor. As illustrated in FIG. 3, the left-front side radar device 11fl may monitor a region Afl diagonally forward left of the own vehicle M, and the right-front side radar device 11fr may monitor a region Afr diagonally forward right of the own vehicle M. The left-front side radar device 11fl and the right-front side radar device 11fr may be disposed such that the regions Afl and Afr are partly superimposed on the front region Af monitored by the main camera 11a and the sub-camera 11b.

The left-rear side radar device 11rl and the right-rear side radar device 11rr may be respectively disposed on the left and right sides of the rear bumper, for example. The left-rear side radar device 11rl and the right-rear side radar device 11rr may monitor respective regions that the left-front side radar device 11fl and the right-front side radar device 11fr are not able to monitor. As illustrated in FIG. 3, the left-rear side radar device 11rl may monitor a region Arl extending from the left side of the own vehicle M to behind the own vehicle M, and the right-rear side radar device 11rr may monitor a region Arr extending from the right side of the own vehicle M to behind the own vehicle M. The left-rear side radar device 11rl and the right-rear side radar device 11rr may be disposed such that the regions Arl and Arr are partly superimposed on each other and the respective regions Afl and Afr.

The radar devices 11fl, 11fr, 11rl, and 11rr may each include a millimeter-wave radar, a laser radar, a light detection and ranging (LIDER), or the like. The radar devices 11fl, 11fr, 11rl, and 11rr may each emit a radar wave (e.g., a radio wave or a laser beam) in a horizontal direction in every predetermined frame cycle and receive the reflective wave of the emitted radar wave. The radar device 11fl, 11fr, 11rl, or 11rr may detect a plurality of reflective points on a three-dimensional object present around the own vehicle M. Thereafter, the radar device 11fl, 11fr, 11rl, or 11rr may recognize the three-dimensional object by analyzing and grouping the positions of the detected reflective points (a relative position between the three-dimensional object and the own vehicle M) and the moving speed of the three-dimensional object. Additionally, the radar device 11fl, 11fr, 11rl, or 11rr may select a representative points Pr (see FIGS. 7 to 9) from the reflective points on the three-dimensional object recognized. The representative point Pr may be any of the reflective points closest to the own vehicle M in a straight line. Thereafter, the radar device 11fl, 11fr, 11rl, or 11rr may acquire data on the representative point Pr, such as the position and a relative speed Vr of the reflective point corresponding to the representative point Pr, and calculate the dimensions of the three-dimensional object on the basis of the distribution of the reflective point (see FIGS. 10 and 11). The three-dimensional object recognized by the radar device 11fl, 11fr, 11rl, or 11rr may be hereinafter referred to as a radar object.

The data on the radar object recognized by the radar device 11fl, 11fr, 11rl, or 11rr may be transmitted to the first traveling environment recognizing section 11*d*. In this way, the first traveling environment recognizing section 11*d* may recognize not only a preceding vehicle present in front of the own vehicle M and also a vehicle traveling in parallel with the own vehicle M, a vehicle traveling on a road crossing the own vehicle traveling route, such as an intersection, toward the own vehicle M, a following vehicle present behind the own vehicle M, and other mobile objects.

The first traveling environment recognizing section 11*d* may convert the position of the camera object or the radar object into a Cartesian coordinate system with an origin O at the center of the own vehicle M, for example. The Cartesian coordinate system may have a Z-axis extending in a length direction of the own vehicle M, and an X-axis extending in a width direction of the own vehicle M, as illustrated in FIG. 3, for example.

Although described later, in the example embodiment in which emergency brake control is executed to avoid contact with a crossing mobile object on the basis of the data received from the radar device, the locator unit 12 and the control system 100 are not essential components and may be omitted as appropriate. In this case, various sensors, such as a forward-rearward acceleration sensor 14, a wheel speed sensor 15, and a gyroscope sensor 16 in the locator unit 12 may be coupled to the first traveling environment recognizing section 11*d* or the traveling ECU 22, for example.

Likewise, in the example embodiment in which the emergency brake control is executed to avoid contract with a crossing mobile object on the basis of the data received from the radar device, the stereo camera (i.e., the main camera 11*a* and the sub-camera 11*b*) and the IPU 11*c* are not essential components and may be omitted as appropriate.

The locator unit 12 may estimate the position of the own vehicle M on the road map. The locator unit 12 may include a locator calculation processor 13 that estimates the position of the own vehicle M. The locator calculation processor 13 may have an input side to which various sensors necessary to estimate the position of the own vehicle M (hereinafter also referred to as an own vehicle position) are coupled. Examples of the various sensors may include the forward-rearward acceleration sensor 14, the wheel speed sensor 15, the gyroscope sensor 16, and a GNSS receiver 17. The forward-rearward acceleration sensor 14 may detect forward or rearward acceleration of the own vehicle M. The wheel speed sensor 15 may detect the revolution speeds of the front, rear, left, and right wheels. The gyroscope sensor 16 may detect an angular speed or angular acceleration of the own vehicle M. The GNSS receiver 17 may receive positioning signals from a plurality of positioning satellites. To the locator calculation processor 13, a transceiver 18 may be coupled. The transceiver 18 may send and receive data to/from the control system 100. That is, the transceiver 18 may establish road-to-vehicle communication as indicated by a dashed-dotted line in FIG. 2. Further, the transceiver 18 may send and receive data to/from the other vehicles. That is, the transceiver 18 may establish inter-vehicle communication as indicated by a dashed-two dotted line in FIG. 2.

Further, to the locator calculation processor 13, a high-resolution road map database 19 may be coupled. The high-resolution road map database 19 may be a mass storage medium such as an HDD in which high-resolution road map information (a dynamic map) is stored. The high-resolution road map information may be needed when the traveling control of the own vehicle M is executed. For example, the high-resolution road map information may include data similar to the road map information sequentially updated by the road map information integration ECU 101. That is, the high-resolution road map information may include four information layers: static information and quasi-static information that mainly include road information, quasi-dynamic information and dynamic information that mainly include traffic information.

The locator calculation processor 13 may include a map information acquiring section 13*a*, an own-vehicle position estimating section 13*b*, and a second traveling environment recognizing section 13*c*.

The map information acquiring section 13*a* may retrieve route map information from the map information stored in the high-resolution road map database 19 on the basis of a destination set by the driver for automatic driving, for example. The route map information may indicate the route from a current location to the destination.

Further, the map information acquiring section 13*a* may transmit the acquired route map information (data on the lane lines on the route map) to the own-vehicle position estimating section 13*b*. The own-vehicle position estimating section 13*b* may acquire the positional coordinates of the own vehicle M on the basis of the positioning signals received by the GNSS receiver 17. Further, the own-vehicle position estimating section 13*b* may estimate the own vehicle position on the road map by performing map matching of the acquired positional coordinates on the route map information. Through the map matching of the acquired positional coordinates on the route map information, the own-vehicle position estimating section 13*b* may also recognize left and right lane dividing lines that define the own vehicle traveling road (the own vehicle traveling lane) and acquire the road curvature of the middle of the own-vehicle traveling lane stored in the road map information.

In an environment (e.g., inside a tunnel) in which the GNSS receiver 17 is not able to receive effective positional signals from the positioning satellites due to a decrease in the sensitivity of the GNSS receiver 17, the own-vehicle position estimating section 13*b* may make a switch to autonomous navigation. In the autonomous navigation, the own-vehicle position estimating section 13*b* may estimate the own vehicle position on the road map on the basis of the vehicle speed calculated from the wheel speeds detected by the wheel speed sensor 15, the angular speed detected by the gyroscope sensor 16, and the forward or rearward acceleration rate detected by the forward-rearward acceleration sensor 14.

After estimating the own vehicle position on the road map on the basis of the positioning signals received by the GNSS receiver 17 and the data detected by the gyroscope sensor 16 and the like, the own-vehicle position estimating section 13*b* may determine the type of the traveling road on which the own vehicle M is traveling on the basis of the estimated own vehicle position on the road map.

The second traveling environment recognizing section 13*c* may update the road map information stored in the high-resolution road map database 19 to the latest one using the road map information acquired through external communication (e.g., the road-to-vehicle communication and the inter-vehicle communication) via the transceiver 18. The update of the information may be conducted on the static information, the quasi-static information, the quasi-dynamic information, and the dynamic information. The road map information may thus include the road information and the traffic information received through the communication with external devices, enabling substantially real time updating of the information on mobile objects, such as vehicles traveling on the road.

Further, the second traveling environment recognizing section 13c may verify the road map information on the basis of the traveling environment information recognized by the traveling environment recognizing unit 11 and update the road map information stored in the high-resolution road map database 19 to the latest one. The update of the information may be conducted on the static information, the quasi-static information, the quasi-dynamic information, and the dynamic information. Accordingly, the information on mobile objects, such as vehicles traveling on the road, recognized by the traveling environment recognizing unit 11 may be updated in real time.

The road map information updated in this way may be transmitted to the control system 100 and the other vehicles present around the own vehicle M through the road-to-vehicle communication or the inter-vehicle communication via the transceiver 18.

Further, the second traveling environment recognizing section 13c may retrieve second traveling environment information from the updated road map information. The second traveling environment information may be the road map information within a predetermined region around the own vehicle position estimated by the own-vehicle position estimating section 13b. The range of the second traveling environment information retrieved by the second traveling environment recognizing section 13c may be larger than the range of the first traveling environment information retrieved by the first traveling environment recognizing section 11d. For example, the second traveling environment information may be the road map information within a one-kilometer radius from the own vehicle position.

The first traveling environment information retrieved by the first traveling environment recognizing section 11d in the traveling environment recognizing unit 11 and the second traveling environment information retrieved by the second traveling environment recognizing section 13d in the locator unit 12 may be read by the traveling ECU 22. The traveling ECU 22 may have an input side to which various switches or sensors are coupled. Examples of the various switches or sensors may include a mode switch, a steering torque sensor, a brake sensor, an accelerator sensor, and a yaw rate sensor that are not illustrated. The driver may operate the mode switch to enable or disable the automatic driving (traveling control). The steering torque sensor may detect the amount of a driving operation performed by the driver such as the steering torque. The brake sensor may detect the amount of a driving operation performed by the driver such as the stepping quantity of the brake pedal. The yaw rate sensor may detect the yaw rate of the own vehicle M.

The traveling ECU 22 may switch the drive mode between a manual drive mode, traveling control modes including a first traveling control mode and a second traveling control mode, and an evacuation mode. The traveling ECU 22 may selectively switch the drive mode between these modes on the basis of the operation state of the mode switch, for example.

The manual drive mode may be a drive mode in which the driver is required to hold the steering wheel. For example, the own vehicle M may be caused to travel in accordance with a driving operation, such as a steering operation and a brake operation, performed by the driver in the manual drive mode.

Likewise, the first traveling control mode may be a drive mode in which the driver is required to hold the steering wheel. That is, the first traveling control mode may be a semi-automatic drive mode in which the own vehicle M is caused to travel along a target traveling route mainly under an appropriate combination of adaptive cruise control (ACC), active lane keep centering (ALKC) control, and active lane keep bouncing control that are implemented by the E/G ECU 23, the PS ECU 24, and the BK ECU 25, for example, while the driving operation performed by the driver is reflected.

The second traveling control mode may be an automatic drive mode in which the own vehicle M is caused to travel on the basis of a target route (the route map information) mainly under an appropriate combination of the ACC, the ALKC control, the active lane keep bouncing control that are implemented by the E/G ECU 23, the PS ECU 24, and the BK ECU 25, for example, without requiring the driver to perform a steering operation, an acceleration operation nor a brake operation.

The evacuation mode may be a mode in which the own vehicle M is automatically stopped on a side strip in a case where the own vehicle M is no longer able to continue to travel in the second traveling control mode and where the driving operation cannot be taken over by the driver (i.e., when switchover to the manual drive mode or the first traveling control mode cannot be made).

In each of the drive modes, the traveling ECU 22 may perform autonomous emergency braking (AEB) control, collision avoidance system control, and front cross traffic brake (FCTB) control against an obstacle having a high possibility of making contact with the own vehicle M as appropriate. These emergency brake control may be executed basically on the basis of the first traveling environment information. Among these emergency brake control, the FCTB control may be performed on the basis of the radar object.

In a case where an obstacle such as a preceding vehicle or an oncoming vehicle is detected on the own vehicle traveling route, for example, the traveling ECU 22 may set a target stop point Pt at a position shifted from the rear end of the obstacle toward the own vehicle M by a predetermined distance Δz (e.g., 30 cm). Additionally, the traveling ECU 22 may calculate time to collision (TTC) on the basis of the target stop point Pt. The TTC may be calculated by dividing the distance from the own vehicle M to the target stop point Pt by the relative speed between the own vehicle M and the obstacle, for example. If the calculated TTC is equal to or less than a predetermined time threshold Tth, the traveling ECU 22 may execute the AEB against the obstacle.

Figure 7:
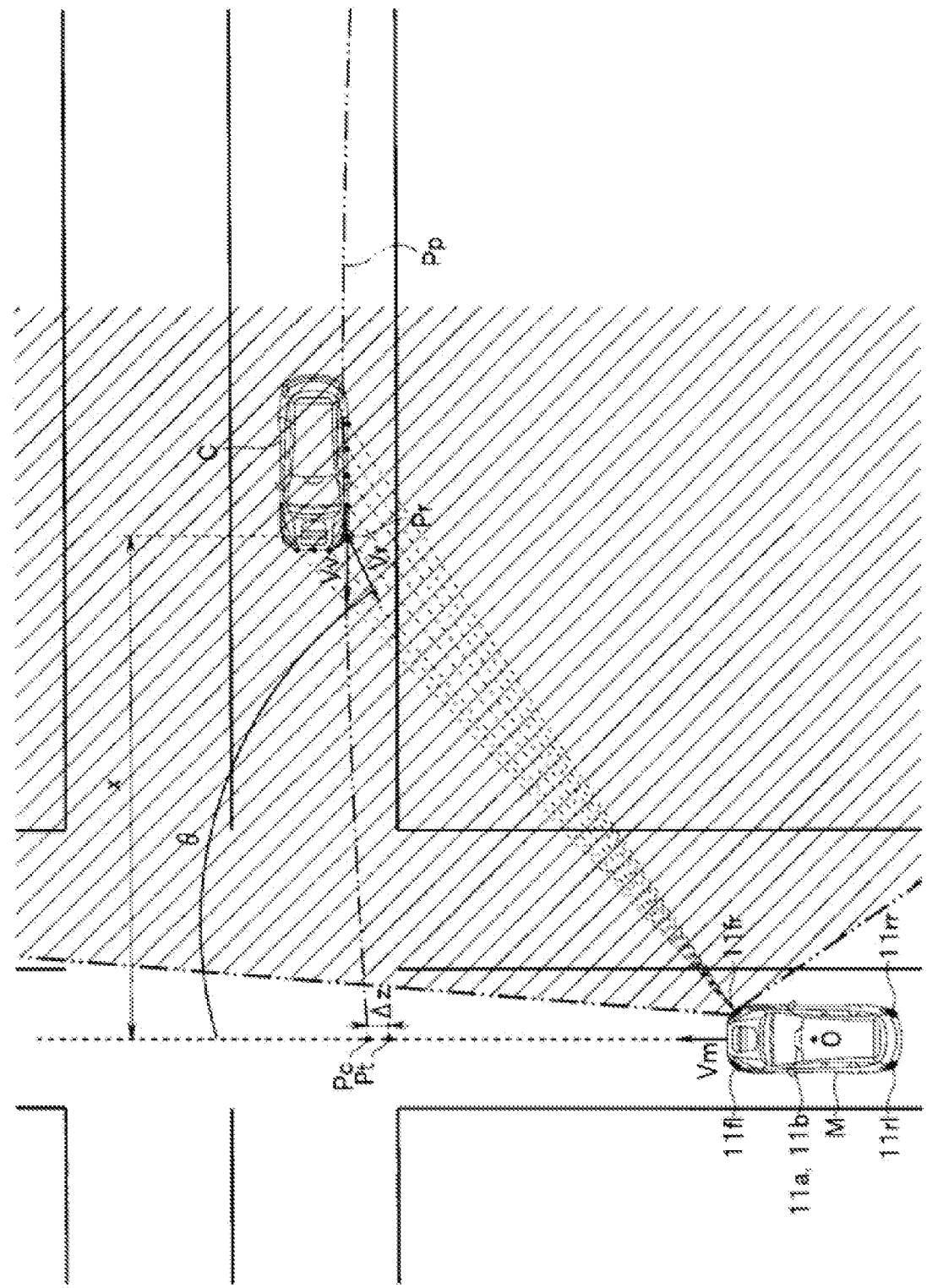
FIG. 7 is an explanatory diagram illustrating a mobile object moving on a traveling road crossing an own vehicle traveling road.
Figure 8:
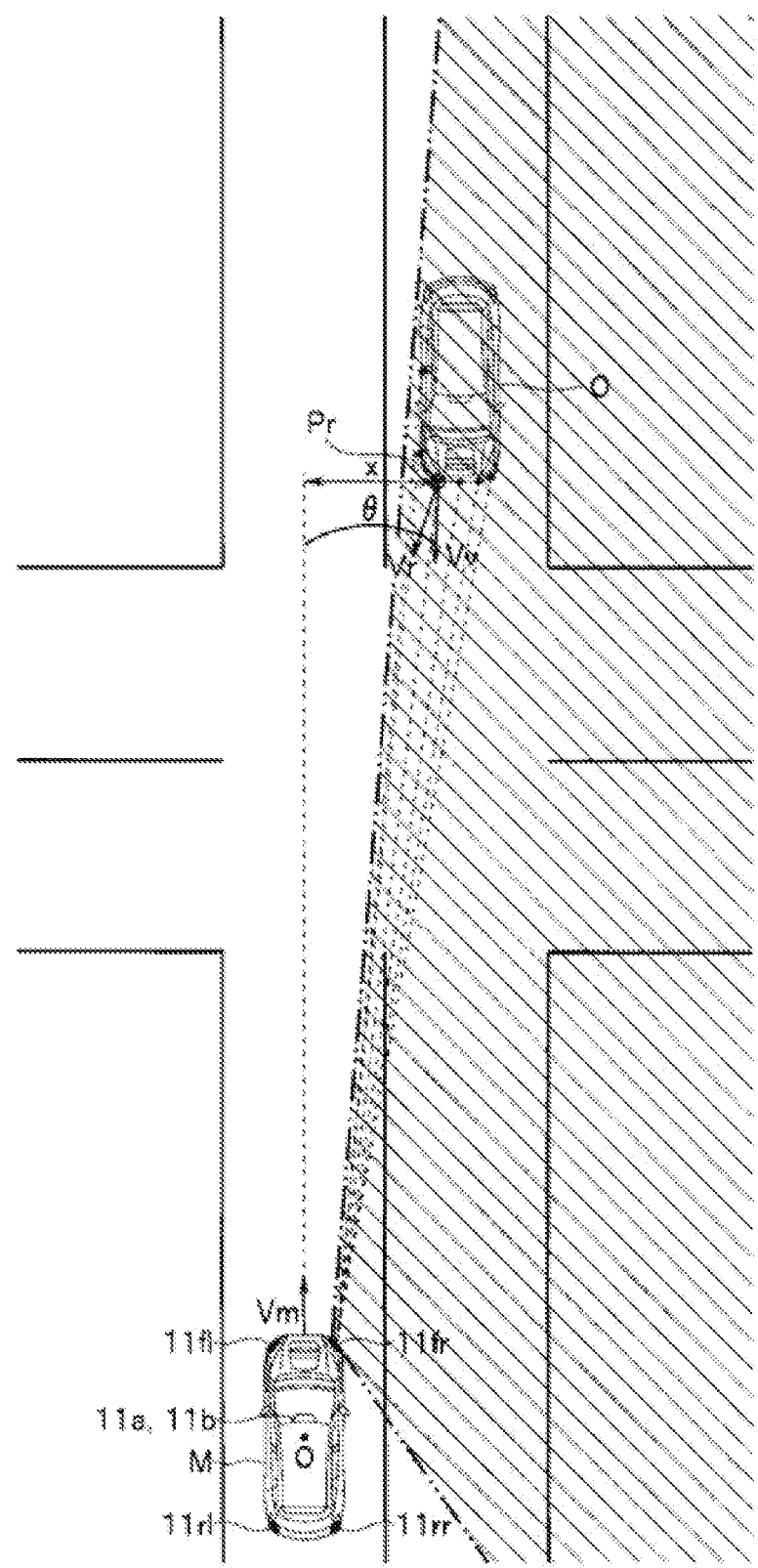
FIG. 8 is an explanatory diagram illustrating a mobile object moving on an oncoming traveling road directed opposite to the own vehicle traveling road.

In a case where an obstacle or a mobile object such as a crossing vehicle (hereinafter referred to as a crossing mobile object C) is detected by the radar device, for example, the traveling ECU 22 may calculate a predicted traveling route Pp of the crossing mobile object C on the basis of the movement locus of the crossing mobile object C and the like, and calculate a crossing point Pc between the own vehicle traveling route and the predicted traveling route Pp of the crossing mobile object C (see FIG. 7). Thereafter, the traveling ECU 22 may set the target stop point Pt at a position shifted from the crossing point Pc toward the own vehicle M by the predetermined distance Δz (e.g., 30 cm) (see FIG. 7). Additionally, the traveling ECU 22 may calculate the TTC that is an estimated time when the own vehicle M traveling at a current own vehicle speed Vm will arrive at the target stop point Pt. That is, in the emergency brake control against the crossing mobile object C, the TTC may be calculated by dividing the distance from the own vehicle M to the target stop point Pt by the own vehicle speed Vm, for example. Additionally, the traveling ECU 22 may evaluate the possibility of contact of the own vehicle M with the crossing mobile object C at the crossing point Pc on the basis of the relative positional relationship between the own vehicle M and the crossing mobile object C, the own vehicle speed Vm, and the speed Vc of the crossing mobile object C. In a case where the own vehicle M has the possibility of making contact with the crossing mobile object C and where the TTC is equal to or less than the predetermined time threshold Tth, the traveling ECU 22 may execute the emergency brake control against the obstacle.

The evaluation of the possibility of contact of the own vehicle M with the crossing mobile object C may involve, for example, calculating a predicted position of the crossing mobile object C after the elapse of the TTC on the basis of the speed Vc of the crossing mobile object C and determining whether the predicted position of the crossing mobile object C is located within a contact predicted region set with respect to the crossing point Pc. Alternatively, the evaluation of the possibility of contact of the own vehicle M with the crossing mobile object C may involve, for example, determining if the rate of a distance Lm to a distance Lc (Lm/Lc) is identical to the rate of the own vehicle speed Vm to the speed Vc of the crossing mobile object C (Vm/Vc) within a given error range, where the distance Lm denotes the distance from the crossing point Pc to the own vehicle M, and the distance Lc denotes the distance from the crossing point Pc to the crossing mobile object C.

Meanwhile, the traveling ECU 22 may determine whether the mobile object (radar object) is the crossing mobile object C on the basis of the direction of the velocity vector Vv of the mobile object, for example.

For instance, the traveling ECU 22 may extract the mobile object (radar object) having a velocity component approaching the own vehicle M from the mobile objects detected in front of (including laterally in front of) the own vehicle M by the radar devices, and calculate the velocity vector Vv of the extracted mobile object. In a case where the supplementary angle θ of the angle formed by the velocity vector Vv of the extracted mobile object with respect to the own vehicle traveling direction is greater than a predetermined angle threshold θth (e.g., 45°), the traveling ECU 22 may identify the extracted mobile object as the crossing mobile object C. In a case where the supplementary angle θ of the angle formed by the velocity vector Vv of the extracted mobile object with respect to the own vehicle traveling direction is equal to or less than the angle threshold θth, the traveling ECU 22 may identify the extracted mobile object as the oncoming mobile object O present on an oncoming lane (see FIGS. 7 and 8).

For example, when the oncoming mobile object O is decelerating and moving at a low speed, the displacement of the representative point Pr in the length direction of the own vehicle M become small. This can cause an error in detecting the representative point Pr in the width direction of the own vehicle M at a high rate. In this case, the supplementary angle θ of the angle formed by the velocity vector Vv can become large even though the mobile object is actually the oncoming mobile object O, and the oncoming mobile object O can be wrongly identified as the crossing mobile object C. To address such a concern, the traveling ECU 22 makes a determination to exclude the wrongly identified crossing mobile object C from the targets of the FCTB control (hereinafter referred to as an exclusion determination).

In the exclusion determination, the traveling ECU 22 determines whether the mobile object had been an oncoming mobile object O (i.e., whether the supplementary angle θ of the angle formed by the velocity vector Vv was equal to or less than the angle threshold θth) before the mobile object is identified as the crossing mobile object C (i.e., before the supplementary angle θ of the angle formed by the velocity vector Vv is detected to be greater than the angle threshold θth).

Further, the traveling ECU 22 determines whether the distance (lateral position) x from the own vehicle M to the crossing mobile object C in the width direction of the own vehicle M is small.

Figure 9:
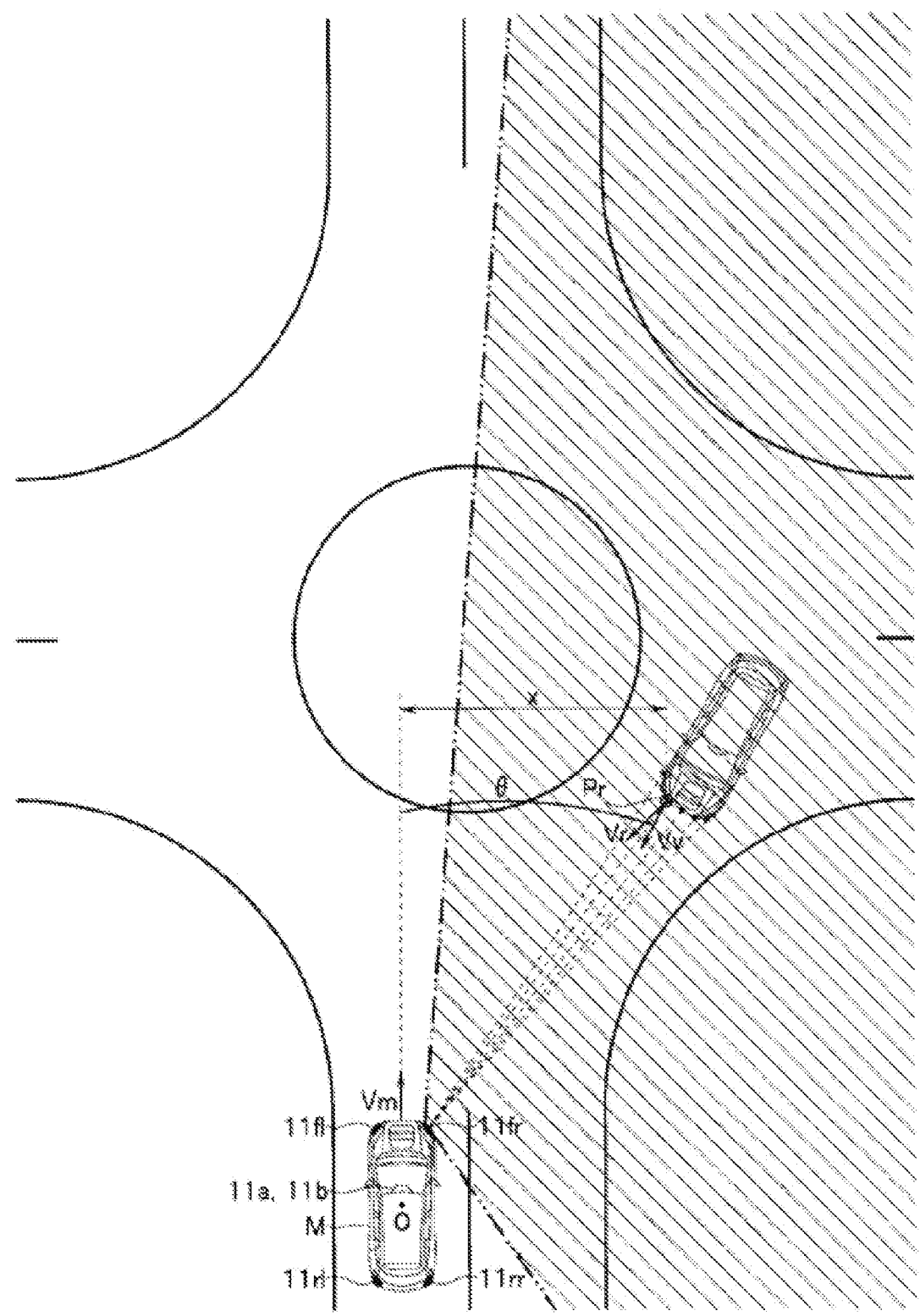
FIG. 9 is an explanatory diagram illustrating a mobile object moving on a roundabout crossing the own vehicle traveling road.

For example, in a case where the oncoming mobile object O turns in the own vehicle traveling direction as a crossing mobile object C, the crossing mobile object C generally moves closer to the lane dividing line adjacent to the own vehicle traveling lane at the time the turn is detected. In this case, the representative point Pr of the mobile object is present at a lateral position within a predetermined distance range set with respect to the own vehicle M. Thus, the traveling ECU 22 may determine whether the distance x from the own vehicle M to the crossing mobile object C is equal to or less than a predetermined distance threshold xth (e.g., 7 m in view of the lane width, etc.). By making such a determination, the target of the exclusion determination is limited to the mobile object that had been the oncoming mobile object O. For example, as illustrated in FIG. 9, the crossing mobile object C traveling on a roundabout or the like is prevented from being wrongly identified as a target of the exclusion determination.

Further, the traveling ECU 22 determines whether the size of the crossing mobile object C recognized by the radar device has been maintained less than a predetermined value for a predetermined period of time or longer.

Figure 10:
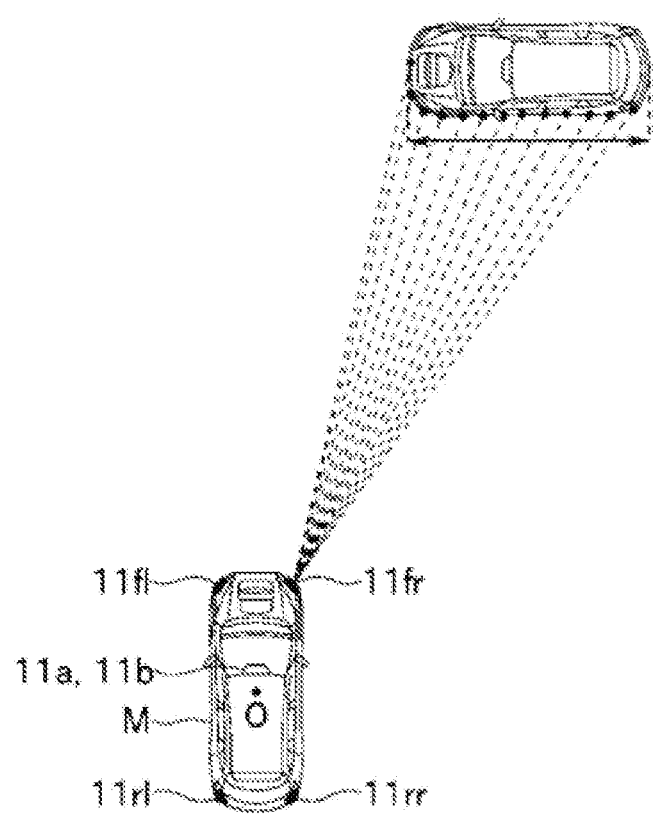
FIG. 10 is an explanatory diagram illustrating the size of a mobile object calculated from the reflective points detected by the radar device.
Figure 11:
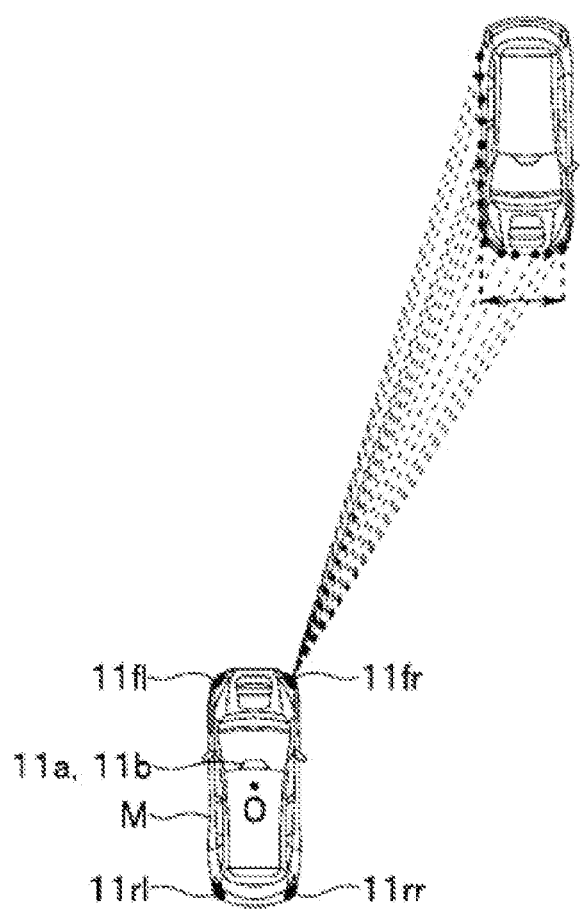
FIG. 11 is an explanatory diagram illustrating the size of a mobile object calculated from the reflective points detected by the radar device.

For example, in a case where the crossing mobile object C is detected as the mobile object, the radar device may recognize the side face of the mobile object at a high rate, as illustrated in FIG. 10. Thus, the size of the mobile object recognized by the radar device may be greater when the crossing mobile object C is detected as the mobile object as illustrated in FIG. 10 than when the oncoming mobile object O is detected as the mobile object as illustrated in FIG. 11. For instance, if the oncoming mobile object O has been wrongly identified as the crossing mobile object C, the size of the oncoming mobile object O recognized by the radar device may be smaller than the size of the crossing mobile object C. Accordingly, the traveling ECU 22 determines whether the size of the mobile object has been maintained less than the predetermined value for the predetermined period of time or longer after the identification as the crossing mobile object C.

Thereafter, the traveling ECU 22 determines that the mobile object has been wrongly identified as the crossing mobile object C and excludes the crossing mobile object C from the targets of the FCTB control in a case where the crossing mobile object C currently identified had been identified as the oncoming mobile object O in the past and where the distance (lateral position) x from the current position of the own vehicle M to the crossing mobile object C in the width direction of the own vehicle M is equal to or less than the distance threshold xth, or in a case where the size of the crossing mobile object C has been maintained less than the predetermined value for the predetermined period of time or longer and where the distance (lateral position) x from the current position of the own vehicle M to the crossing mobile object C is equal to or less than the distance threshold xth.

In one embodiment, the traveling ECU 22 may serve as a "mobile object recognizing unit", a "crossing mobile object identifying unit", an "emergency brake controlling unit", and an "exclusion determining unit".

The E/G ECU 23 may have an output side to which a throttle actuator 35 is coupled. The throttle actuator 35 may open and close an electronically controlled throttle valve disposed on a throttle body of the engine. The throttle actuator 35 may open or close the throttle value in response to a drive signal received from the E/G ECU 23 to regulate the flow rate of the intake air. This generates a desired engine output.

The PS ECU 24 may have an output side to which an electric power steering motor 36 is coupled. The electric power steering motor 36 may impart steering torque to a steering mechanism using the rotatory power of the motor. During the automatic driving, the electric power steering motor 36 may be operated in accordance with a drive signal received from the PS ECU 24 to implement the ALKC control that keeps the own vehicle M traveling on the current traveling lane and lane changing control that moves the own vehicle M to an adjacent lane (e.g., lane changing control for overtaking).

The BK ECU 25 may have an output side to which a brake actuator 37 is coupled. The brake actuator 37 may regulate the hydraulic pressure to be supplied to a brake wheel cylinder of each wheel. When the brake actuator 37 is driven in response to a drive signal received from the BK ECU 25, the brake wheel cylinders may generate brake force on the respective wheels, which forcibly decelerates the own vehicle M.

Figure 4:
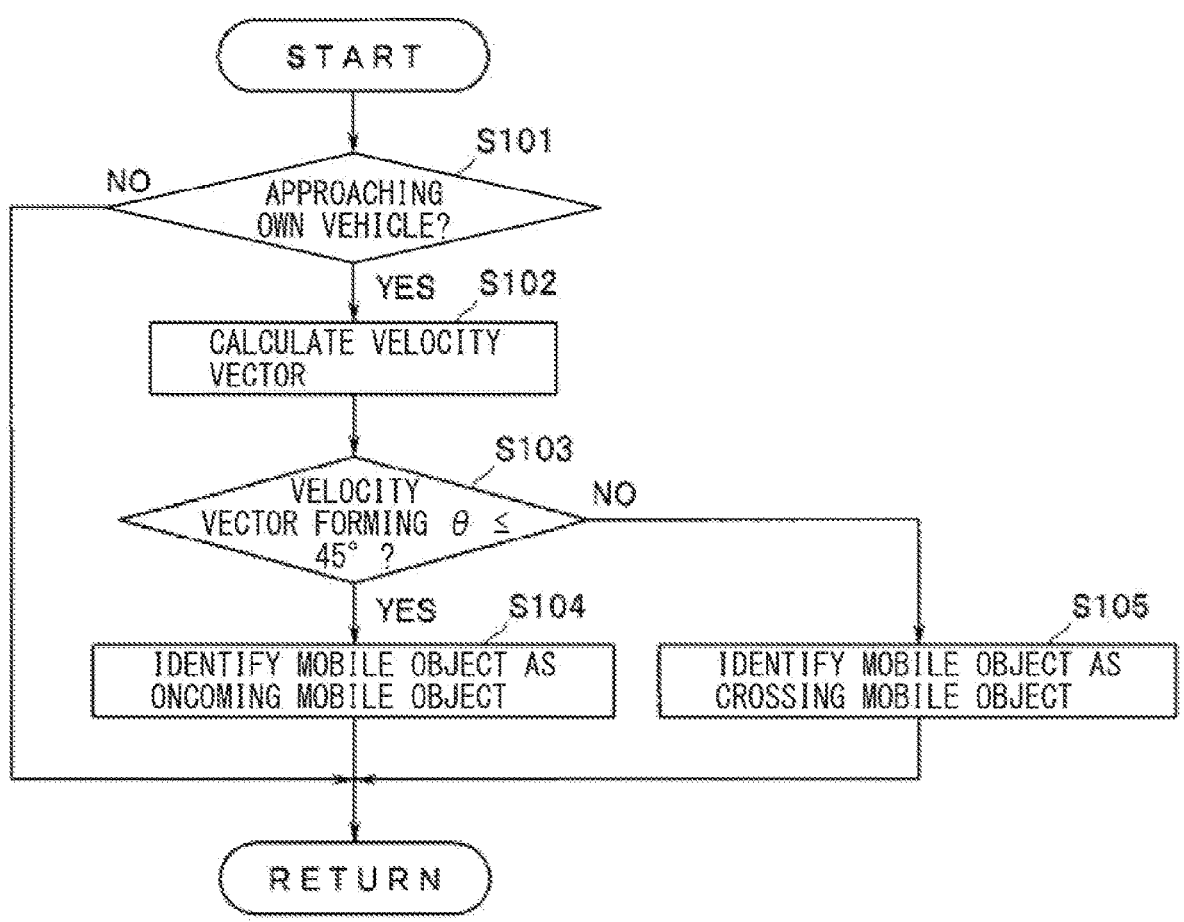
FIG. 4 is a flowchart illustrating an exemplary routine for identifying a crossing mobile object.

Now, the control for identifying the crossing mobile object C is described with reference to a flowchart in FIG. 4 that illustrates an exemplary routine for identifying the crossing mobile object C. This routine may be repeatedly executed in the traveling ECU 22 every predetermined period of time. Note that the mobile objects (radar objects) detected by the radar devices may be subjected to the process for identifying the crossing mobile object C.

When the routine starts, the traveling ECU 22 may determine whether the mobile object (radar object) having a velocity component approaching the own vehicle M is detected in front of (including laterally in front of) the own vehicle M in Step S101.

If there is no such a mobile object in front of the own vehicle M or if there is a mobile object having no velocity component approaching the own vehicle M in front of the own vehicle M (Step S101: NO), the traveling ECU 22 may cause the procedure to exit the routine.

In contrast, if there is a mobile object having a velocity component approaching the own vehicle M in front of the own vehicle M (Step S101: YES), the traveling ECU 22 may cause the procedure to proceed to Step S102.

In Step S102, the traveling ECU 22 may calculate the velocity vector Vv of the mobile object. To calculate the velocity vector Vv, the traveling ECU 22 may extract the representative points Pr of the latest frames previously set (e.g., representative points Pr(n) to Pr(n−15) of the latest 16 frames). Thereafter, the traveling ECU 22 may calculate the velocity vector Vv of the mobile object on the basis of the displacement among these representative points Pr(n) to Pr(n−15).

In Step S103, the traveling ECU 22 may determine whether the supplementary angle θ of the angle formed by the velocity vector Vv of the mobile object calculated in Step S102 with respect to the own vehicle traveling direction is equal to or less than the predetermined angle threshold θth (e.g., 45°).

If the supplementary angle θ of the angle formed by the velocity vector Vv is determined to be greater than the angle threshold θth (Step S103: NO), the traveling ECU 22 may cause the procedure to proceed to Step S105. In Step S105, the traveling ECU 22 may identify the mobile object as the crossing mobile object C and cause the procedure to exit the routine.

In contrast, if the supplementary angle θ of the angle formed by the velocity vector Vv is equal to or less than the angle threshold θth (Step S103: YES), the traveling ECU 22 may cause the procedure to proceed to Step S104. In Step S104, the traveling ECU 22 may identify the mobile object as the oncoming mobile object O and cause the procedure to exit the routine.

Now, an exemplary procedure for the emergency brake control (e.g., the FCTB control) against the identified crossing mobile object C is described with reference to a flowchart in FIG. 5. This routine may be repeatedly executed in the traveling ECU 22 every predetermined period of time.

When the routine starts, the traveling ECU 22 may determine whether the crossing mobile object C is identified in Step S201.

If the crossing mobile object C is determined not to be identified (Step S201: NO), the traveling ECU 22 may cause the procedure to exit the routine.

In contrast, if the crossing mobile object C is determined to be identified (Sep S201: YES), the traveling ECU 22 may cause the procedure to proceed to Step S202. In Step S202, the traveling ECU 22 may determine whether the crossing mobile object C is to be excluded from the targets of the FCTB control.

Figure 6:
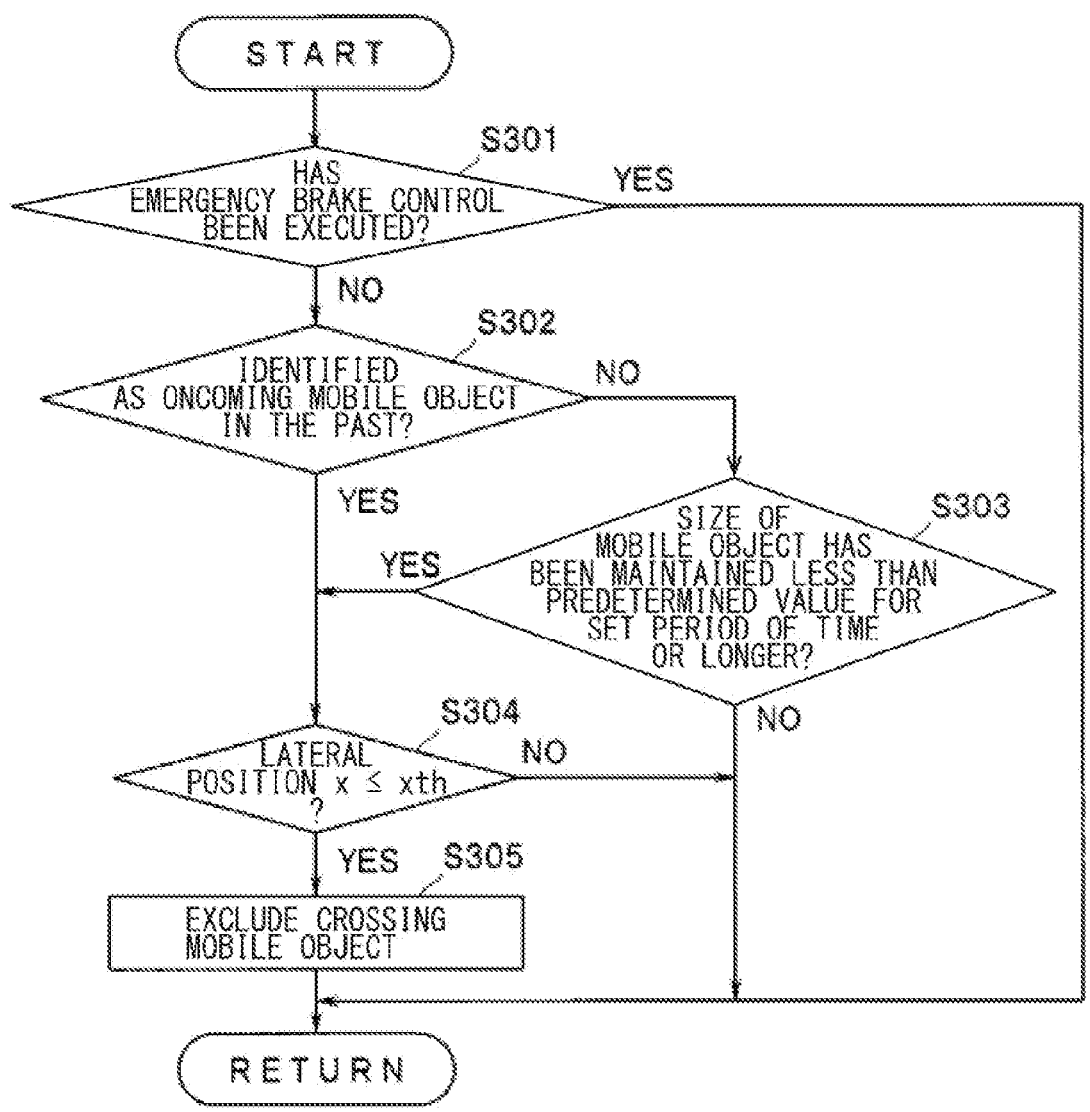
FIG. 6 is a flowchart illustrating an exemplary sub-routine for determining whether the crossing mobile object is to be excluded.

The exclusion determination may be performed in accordance with, for example, a flowchart in FIG. 6 that illustrates an exemplary sub-routine for the exclusion determination regarding the crossing mobile object C. The exclusion determination may be performed to exclude the oncoming mobile object O wrongly identified as the crossing mobile object C from the targets of the FCTB control.

When the sub-routine starts, the traveling ECU 22 may determine whether the emergency brake control such as the FCTB control has been executed in Step S301.

If the emergency brake control is determined to have been executed (Step S301: YES), the traveling ECU 22 may cause the procedure to exit the sub-routine. That is, once the emergency brake control is executed against the mobile object identified as the crossing mobile object C, the traveling ECU 22 may cause the procedure to exit the sub-routine without performing the exclusion determination in order to prevent control hunting.

In contrast, if the emergency brake control is determined not to have been executed (Step S301: NO), the traveling ECU 22 may cause the procedure to proceed to Step S302.

In Step S302, the traveling ECU 22 may determine whether the supplementary angle θ of the angle formed by the velocity vector Vv with respect to the own vehicle traveling direction was equal to or less than the angle threshold θth in the previous frame set before the mobile object is identified as the crossing mobile object C. That is, the traveling ECU 22 may evaluate the possibility that the mobile object had been the oncoming mobile object O before being identified as the crossing mobile object C, on the basis of the supplementary angle θ of the angle formed by the velocity vector Vv in the previous frame set before the mobile object is identified as the crossing mobile object C.

In a case where the supplementary angle θ of the angle formed by the velocity vector Vv was greater than the angle threshold θth and where it is determined that the mobile object had not been identified as the oncoming mobile object O in the past (Step S302: NO), the traveling ECU 22 may cause the procedure to proceed to Step S303.

In contrast, in a case where the supplementary angle θ of the angle formed by the velocity vector Vv was equal to or less than the angle threshold θth and where it is determined that the mobile object had been identified as the oncoming mobile object O in the past (Step S302: YES), the traveling ECU 22 may cause the procedure to proceed to Step S304.

In Step S303, the traveling ECU 22 may determine whether the size of the mobile object identified as the crossing mobile object C has been maintained less than the predetermined value for the predetermined period of time or longer. For example, if the oncoming mobile object O has been wrongly identified as the crossing mobile object C, the radar device detects the side face of the mobile object at a low rate. Thus, the size of the detected mobile object becomes smaller than the actual size of the crossing mobile object C. Accordingly, the traveling ECU 22 may verify whether the mobile object is actually the crossing mobile object C on the basis of the determination as to whether the size of the mobile object identified as the crossing mobile object C is less than a predetermined value, which is determined on the basis of a typical size (e.g., aspect ratio) of a mobile object such as a vehicle. In this case, to prevent false determination from being caused by false detection of the size of the mobile object by the radar device, the traveling ECU 22 may determine whether the size of the mobile object has been maintained less than the predetermined value for the predetermined period of time or longer.

If the size of the mobile object identified as the crossing mobile object C is determined to be equal to or greater than the predetermined value or if the size of the mobile object identified as the crossing mobile object C is determined to be less than the predetermined value but the size of the mobile object has not been maintained for the predetermined period of time or longer (Step S303: NO), the traveling ECU 22 may cause the procedure to exit the sub-routine.

In contrast, if the size of the mobile object identified as the crossing mobile object C has been maintained less than the predetermined value for the predetermined period of time or longer (Step S303: YES), the traveling ECU 22 may cause the procedure to proceed to Step S304.

In Step S304, the traveling ECU 22 may determine whether the lateral position x of the mobile object was equal to or less than the predetermined distance threshold xth at the time the mobile object was identified as the crossing mobile object C. That is, the traveling ECU 22 may verify the possibility that the mobile object had been the oncoming mobile object O before being identified as the crossing mobile object C, on the basis of the lateral position x.

If the lateral position x of the mobile object is determined to be greater than the distance threshold xth at the time the mobile object is identified as the crossing mobile object C (Step S304: NO), the traveling ECU 22 may cause the procedure to exit the sub-routine.

In contrast, if the lateral position x of the mobile object is determined to be equal to or less than the distance threshold xth at the time the mobile object is identified as the crossing mobile object C (Step S304: YES), the traveling ECU 22 may cause the procedure to proceed to Step S305. In Step S305, the traveling ECU 22 may determine that the mobile object currently identified as the crossing mobile object C is to be excluded from the targets of the FCTB control and cause the procedure to exit the sub-routine.

Figure 5:
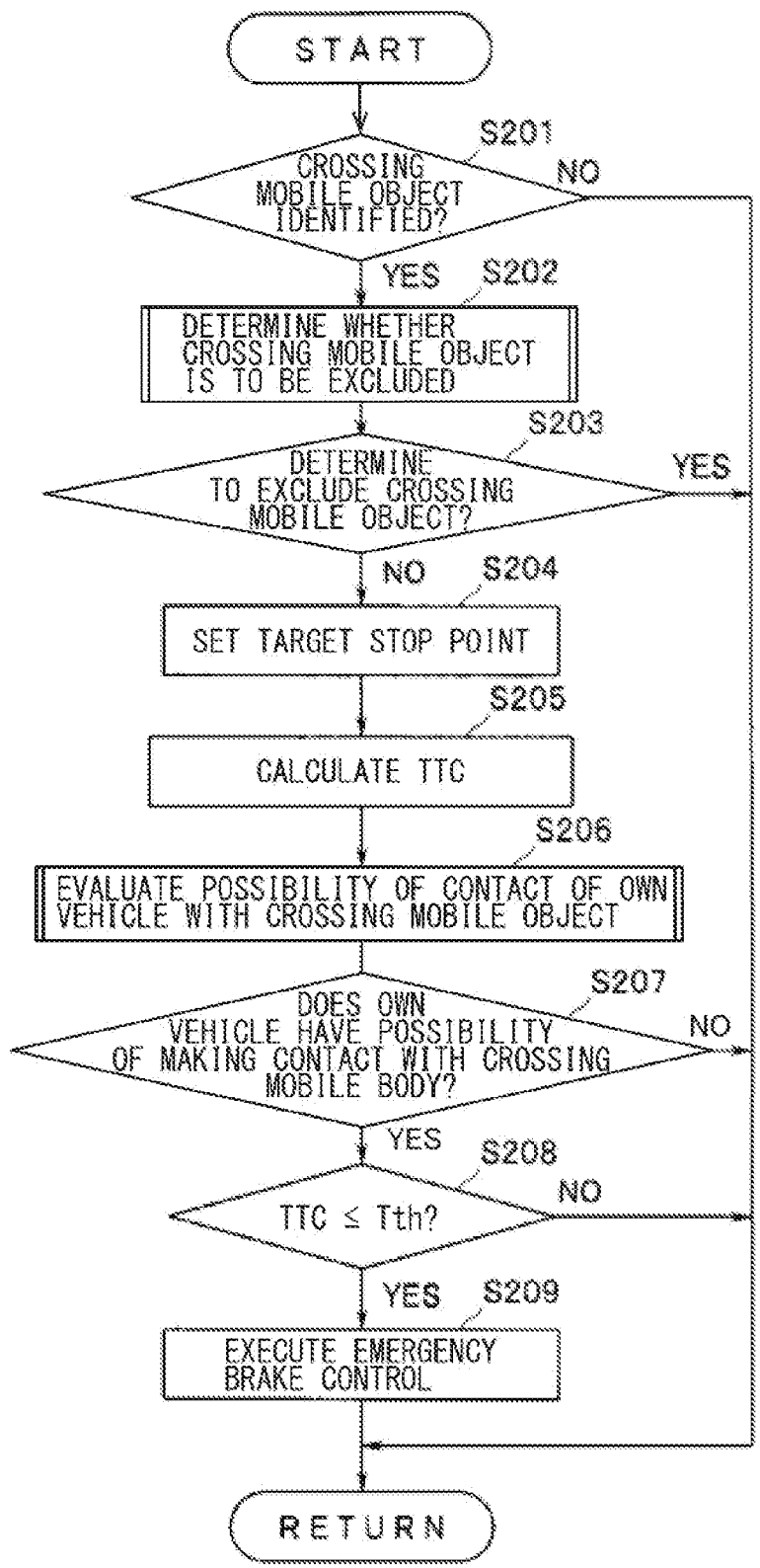
FIG. 5 is a flowchart illustrating an exemplary routine for executing emergency brake control against the crossing mobile object.

When the procedure proceeds from Step S202 to Step S203 of the main routine illustrated in FIG. 5, the traveling ECU 22 may determine whether the determination in Step S202 indicates that the crossing mobile object C is to be excluded from the targets of the FCTB control.

If the determination in Step S202 indicates that the crossing mobile object C is to be excluded from the targets of the FCTB control (Step S203: YES), the traveling ECU 22 may cause the procedure to exit the routine after Step S203.

In contrast, the determination in Step S202 indicates that the crossing mobile object C is not to be excluded from the targets of the FCTB control (Step S203: NO), the traveling ECU 22 may cause the procedure to proceed from Step S203 to Step S204. In Step S204, the traveling ECU 22 may set the target stop point Pt with respect to the crossing mobile object C. For example, the traveling ECU 22 may calculate the crossing point Pc between the trajectory of the predicted traveling route of the crossing mobile object C and the own vehicle traveling route. Thereafter, the traveling ECU 22 may set the target stop point Pt at a position shifted from the crossing point Pc toward the own vehicle M by the predetermined distance Δz (e.g., 30 cm).

In Step S205, the traveling ECU 22 may calculate the time to collision (TTC), which is the estimated time of contact with the crossing mobile object C. For example, the traveling ECU 22 may calculate the TTC by dividing the distance from the own vehicle M to the target stop point Pt by the own vehicle speed Vm.

In Step S206, the traveling ECU 22 may evaluate the possibility of contact of the own vehicle M with the crossing mobile object C at the crossing point Pc.

For example, in Step S206, the traveling ECU 22 may calculate the predicted position of the crossing mobile object C after the elapse of the TTC on the basis of the speed Vc of the crossing mobile object C in the traveling direction. Additionally, the traveling ECU 22 may set the contact predicted region extending in the width direction of the own vehicle M with respect to the crossing point Pc. If the predicted position of the crossing mobile object C is located within the contact predicted region, the traveling ECU 22 may determine that the own vehicle M has a possibility of making contact with the crossing mobile object C.

In Step S207, the traveling ECU 22 may determine whether the evaluation in Step S206 indicates that the own vehicle M has the possibility of making contact with the crossing mobile object C.

If the evaluation in Step S206 indicates that the own vehicle M does not have the possibility of making contact with the crossing mobile object C (Step S207: NO), the traveling ECU 22 may cause the procedure to exit the routine after Step S207.

In contrast, if the evaluation in Step S206 indicates that the own vehicle M has the possibility of making contact with the crossing mobile object C (Step S207: YES), the traveling ECU 22 may cause the procedure to proceed from Step S207 to Step S208. In Step S208, the traveling ECU 22 may determine whether the TTC is equal to or less than the predetermined time threshold Tth.

If the TTC is determined to be greater than the predetermined time threshold Tth (Step S208: NO), the traveling ECU 22 may cause the procedure to exit the routine.

In contrast, if the TTC is determined to be equal to or less than the predetermined time threshold Tth (Step S208: YES), the traveling ECU 22 may cause the procedure to proceed to Step S209. In Step S209, emergency braking may be executed, and the procedure may exit the routine. For example, the traveling ECU 22 may calculate a target deceleration rate for stopping the own vehicle M at the target stop point Pt on the basis of the distance from the own vehicle M to the target stop point Pt and the own vehicle speed Vm. Thereafter, the traveling ECU 22 may perform brake control on the basis of the target deceleration rate using the BK ECU 25.

According to the example embodiments described above, the traveling ECU 22 calculates the velocity vector of the mobile object detected by the radar device on the basis of the moving direction of the mobile object measured in a number of the latest frames previously set. In a case where the supplementary angle θ of the angle formed by the velocity vector of the mobile object with respect to the own vehicle traveling direction is greater than the predetermined angle threshold, the traveling ECU 22 identifies the mobile object as the crossing mobile object C. If the crossing mobile object C has the possibility of making contact with the own vehicle M, the traveling ECU 22 executes emergency brake control to stop the own vehicle M. In this example embodiment, in a case where the supplementary angle θ of the angle formed by the velocity vector Vv of the mobile object was equal to or less than the predetermined angle threshold θth before the mobile object is identified as the crossing mobile object C and where the lateral position x of the mobile object with respect to the own vehicle M is equal to or less than the predetermined distance threshold xth at the time the mobile object is identified as the crossing mobile object C, or in a case where the size of the mobile object identified as the crossing mobile object C has been maintained less than the predetermined value for the predetermined period of time or longer and where the lateral position x of the mobile object with respect to the own vehicle M is equal to or less than the predetermined distance threshold xth at the time the mobile object is identified as the crossing mobile object C, the traveling ECU 22 excludes the crossing mobile object C from the targets of the emergency brake control. Accordingly, it is possible to appropriately determine whether the mobile object is the oncoming mobile object O or the crossing mobile object C and to help prevent emergency braking from being unnecessarily executed.

In the example embodiments described above, the traveling environment recognizing unit 11, the locator unit 12, the traveling ECU 22, the E/G ECU 23, the PS ECU 24, the BK ECU 25, and the road map information integration ECU 101 may each include a known microcomputer having a CPU, a RAM, a ROM, a non-volatile memory, and the like, and peripheral devices. The ROM may preliminarily store programs to be executed by the CPU and fixed data such as data tables, for example. Some or all functions of the processor may be implemented by logic circuitry or analog circuitry. Additionally, the processing of various programs may be implemented by electronic circuitry such as an FPGA.

At least one of the mobile object recognizing unit, the crossing mobile object identifying unit, the emergency brake controlling unit, and the exclusion determining unit in the traveling ECU 22 in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the mobile object recognizing unit, the crossing mobile object identifying unit, the emergency brake controlling unit, and the exclusion determining unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the mobile object recognizing unit, the crossing mobile object identifying unit, the emergency brake controlling unit, and the exclusion determining unit in the traveling ECU 22 illustrated in FIG. 1.

The example embodiments described above may be non-limiting examples and may be modified in various ways without departing from the gist of the technology. For example, although the emergency brake control is executed while the own vehicle M is traveling forward in the foregoing example embodiments, the emergency brake control may be applicable to the own vehicle M traveling backward.

For example, in a case where the above-described concerns may be addressed and the above-described effects may be obtained even if some features are deleted from all the features disclosed herein, the remaining features may be extracted as a technology.

The invention claimed is:

1. A vehicle traveling control apparatus to be applied to a vehicle, the vehicle traveling control apparatus comprising:
a radar device configured to detect a mobile object in every predetermined frame cycle;
a mobile object recognizing unit configured to recognize an approach of the mobile object to the vehicle;
a crossing mobile object identifying unit configured to
calculate a velocity vector of the mobile object on a basis of a moving direction of the mobile object measured in a number of latest frames previously set, and
identify the mobile object as a crossing mobile object in a case where a supplementary angle of an angle formed by the velocity vector with respect to a traveling direction of the vehicle is greater than a predetermined angle threshold;
an emergency brake controlling unit configured to execute emergency braking to stop the vehicle in a case where there is a possibility of contact between the crossing mobile object and the vehicle; and
an exclusion determining unit configured to exclude the crossing mobile object from control targets of the emergency braking in a case where the supplementary angle of the angle formed by the velocity vector of the mobile object was equal to or less than the predetermined angle threshold before the mobile object is identified as the crossing mobile object and where a lateral position of the crossing mobile object with respect to the vehicle is equal to or less than a predetermined distance threshold at time the mobile object is identified as the crossing mobile object, or in a case where a size of the mobile object identified as the crossing mobile object has been maintained less than a predetermined value for a predetermined period of time or longer and where the lateral position of the crossing mobile object with respect to the vehicle is equal to or less than the predetermined distance threshold at the time the mobile object is identified as the crossing mobile object.

2. The vehicle traveling control apparatus according to claim 1, wherein
the exclusion determining unit is configured to refrain from making a determination as to whether the crossing mobile object is to be excluded after the emergency braking is executed by the emergency brake controlling unit.

3. A vehicle traveling control apparatus to be applied to a vehicle, the vehicle traveling control apparatus comprising circuitry configured to recognize, on a basis of information received from a radar device configured to detect a mobile object in every predetermined frame cycle, an approach of the mobile object to the vehicle, calculate a velocity vector of the mobile object on a basis of a moving direction of the mobile object measured in a number of latest frames previously set, identify the mobile object as a crossing mobile object in a case where a supplementary angle of an angle formed by the velocity vector with respect to a traveling direction of the vehicle is greater than a predetermined angle threshold, execute emergency braking to stop the vehicle in a case where there is a possibility of contact between the crossing mobile object and the vehicle, and exclude the crossing mobile object from control targets of the emergency braking in a case where the supplementary angle of the angle formed by the velocity vector of the mobile object was equal to or less than the predetermined angle threshold before the mobile object is identified as the crossing mobile object and where a lateral position of the crossing mobile object with respect to the vehicle is equal to or less than a predetermined distance threshold at time the mobile object is identified as the crossing mobile object, or in a case where a size of the mobile object identified as the crossing mobile object has been maintained less than a predetermined value for a predetermined period of time or longer and where the lateral position of the crossing mobile object with respect to the vehicle is equal to or less than the predetermined distance threshold at the time the mobile object is identified as the crossing mobile object.

\* \* \* \* \*